United States Patent
Järvisalo et al.

(10) Patent No.: US 6,891,818 B1
(45) Date of Patent: May 10, 2005

(54) METHOD IN THE SELECTION OF A TRANSFER WINDOW, AND A MOBILE STATION

(75) Inventors: Jari Järvisalo, Tampere (FI); Arto Leppisaari, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/527,435

(22) Filed: Mar. 16, 2000

(30) Foreign Application Priority Data

Mar. 16, 1999 (FI) .................................................. 990590

(51) Int. Cl.$^7$ .............................................. H04B 7/212
(52) U.S. Cl. ........................ 370/337; 370/347; 370/349
(58) Field of Search ................................. 370/230, 235, 370/236, 329, 341, 349, 347, 337, 282, 310, 355, 465, 345, 338; 714/746, 748, 749

(56) References Cited

U.S. PATENT DOCUMENTS

| | | | |
|---|---|---|---|
| 5,764,651 A | 6/1998 | Bullock et al. | 371/5.5 |
| 5,912,878 A | 6/1999 | Park et al. | 370/229 |
| 6,118,834 A * | 9/2000 | Rasanen | 375/372 |
| 6,301,249 B1 * | 10/2001 | Mansfield et al. | 370/394 |
| 6,415,410 B1 * | 7/2002 | Kanerva et al. | 714/749 |
| 6,496,481 B1 * | 12/2002 | Wu et al. | 370/242 |

FOREIGN PATENT DOCUMENTS

| | | |
|---|---|---|
| EP | 0713302 A2 | 5/1996 |
| EP | 0768806 A2 | 4/1997 |
| WO | WO 98/32304 | 7/1998 |
| WO | WO 98/53576 | 11/1998 |
| WO | WO 99/63702 | 12/1999 |

OTHER PUBLICATIONS

"A Study On The Performance Analysis Of Error Control Algorithms In Digital Cellular DS/CDMA Systems", Woo Lee et al., Proceedings of ICC/SUPERCOMM'94, 1994 International Conference On Communications, Section 3.2.2.

* cited by examiner

Primary Examiner—Chau Nguyen
Assistant Examiner—Soon D. Hyun
(74) Attorney, Agent, or Firm—Perman & Green, LLP

(57) ABSTRACT

A communication method for transmission and reception of data blocks in a packet-switched communication network based on a cellular network (PLMN), between elements, which are used as transmitters and receivers and which comprise means for receiving data blocks, means for transmitting data blocks, and protocol means for forming and processing data. In the method, for the transfer of data blocks at least one transfer window is formed which, formed in the transmitter, is used as a transmit window, which, formed in the receiver, is used as a receive window, and which covers a maximum of k data blocks to be transferred. For optimizing the transfer of data blocks, said maximum size k is selected from a group consisting of several alternative maximum sizes, wherein said maximum size k is selected according to predetermined rules.

14 Claims, 2 Drawing Sheets

METHOD IN THE SELECTION OF A TRANSFER WINDOW, AND A MOBILE STATION

BACKGROUND OF THE INVENTION

1. Field of the Invention

The present invention relates to a method according to the preamble of the appended claim 1. The invention relates to a mobile station according to the preamble of the appended claim 12.

2. Brief Description of Related Developments

A mobile communication system makes a wireless data transmission possible between a mobile station (MS) and the fixed parts in the system when the user moves within the operating range of the system. A typical system is the public land mobile network PLMN, an example of which to be mentioned is the widely known circuit-switched GSM system (Global System for Mobile Telecommunications). The present system is particularly applicable for mobile communication systems under development. As an example of such a mobile communication system, the GPRS system (General Packet Radio Service) will be used in this description. It is obvious that the invention can also be applied in other mobile communication systems (UMTS, 3G).

The basic idea of the GPRS system is to use packet-switched resource allocation, wherein resources, e.g. a logical radio channel for radio communication, are allocated when there is a need to transmit and at receive data and information. Thus, the use of the network and resources available is optimized, to be used as efficiently as possible e.g. in comparison with GSM technology. The GPRS is part of the so-called GSM phase 2+, with the purpose of offering packet-switched data transmission for GSM compatible mobile stations within the GSM infrastructure. In the GPRS system, the allocation of channels is conducted in a flexible manner; for example, for each mobile station, 1 to 8 logical channels can be allocated on a physical channel. The same resources can be allocated to a larger number of active mobile stations, and both uplink data transmission (i.e. data transmission from the mobile station to the base station) and downlink data transmission (i.e. data transmission from the base station to the mobile station) can be allocated separately for the users. The channels are used primarily as control channels and traffic channels. The traffic channels are used for the transmission of data, and the control channels are used for signalling between the base station subsystem (BSS) and the mobile stations (MS). In the GPRS system, the mobile communication network is supplemented with serving GPRS support nodes (SGSN) to offer packet transmission services for the mobile stations via the base transceiver stations (BTS).

The GPRS system makes data transmission more efficient, because the same physical radio channel can be used by several different mobile subscribers. Communication takes place via the mobile station and the base station only when needed, and the physical radio channel is not reserved for communication between the base station and one mobile station only. In the system, a so-called virtual data transmission connection exists between the mobile station and the network. In the GPRS system based on a cellular system, resources include radio channels used for data transmission (PDCH, Packet Data Channels). Signalling used for general control takes place on a PCCCH control channel (Packet Common Control Channel) reserved for that purpose.

More precisely, the physical PDCH channels are divided into logical radio channels by means of a multiframe consisting of 52 TDMA (Time Division Multiple Access) frames that are transmitted repeatedly and divided further into 12 radio blocks (RLC/MAC Block) or time slots which are each divided into 4 frames, and 4 idle frames. In communication, these are used for data transmission and signalling. The blocks are divided further into at least the following parts: MAC header (Medium Access Control Header) which comprises in the downlink direction a USF field (Uplink State Flag) and in the uplink direction an SI field (Stall Indicator), and a RLC data block (Radio Data Block) comprising a TFI field (Temporary Flow Identifier) and a BSN field (Block Sequence Number), or a RLC/MAC control block. The RLC data block comprises also the information to be transmitted, i.e. RLC data. An example of the block structure is illustrated in more detail in FIG. 1.

The BSN field (Block Sequence Number) indicates the respective order of RLC data blocks belonging to each TBF flow, wherein the BSN can have a value from 1 to 127. The SI field (Stall Indicator) indicates if the RLC window of the mobile station is stalled or not. The mobile station sets the value of the SI field in all the uplink blocks accordingly.

As shown in FIG. 2, the terms RLC and, MAC refer to protocol layers of the communication protocol used in the mobile station MS. The communication protocol and the different layers constitute the protocol means of the mobile station for processing and generating data that is received or to be transmitted. The functions of the known RLC/MAC layer 201 (Radio Link Control/Medium Access Control) are needed between the LLC (Logical Link Control) layer 202 and the physical layer 203 of the mobile station MS. Above the LLC layer 202 there are known GPRS mobility management functions (GMM/SM) 205, SNDCP (Subnetwork Dependent Convergency Protocol) functions 204 and also short message service (SMS) functions. The layers are described in more detail in the GSM standard specifications.

The MAC block is used for allocating radio channels between mobile stations as well as to allocate the physical radio channel for the mobile station for receiving and transmitting according to the need. The RLC block is responsible for e.g. the allocation of resources upon request for packets to be transmitted to the mobile communication network and for retransmission over the radio channel. The SNDCP is used as an interface for the PDP (Packet Data Protocol). The SNDCP block compresses the NPDU (Network Protocol Data Unit) blocks received by it and segments them in one or several LLC frames which are further segmented into RLC data blocks. The GMM protocol supports the functions of the mobility management of the mobile station, including loggings in and out (GPRS attach, GPRS detach) and activations (PDP Context Activation, PDP Context Deactivation). The lowermost level, i.e. the so-called physical layer 203 is responsible for the physical modulation of radio waves and the transmission of information between the mobile station and the network. The uppermost layer 206 comprises an application utilizing said protocol stack.

The communication protocol corresponding to that described above and the different layers are also formed in the network, in which the different layers can also be distributed between the base station subsystem, the serving GPRS support node and the gateway GPRS support node.

The basic idea of multiple access in the GPRS network is that the mobile station can receive all the information transmitted by the serving base station. Of the received RLC blocks, the mobile station finds out the data addressed to it. According to the GPRS system, all the mobile stations waiting for data to be transmitted to them on a jointly allocated channel receive also all the blocks of the frame structure with the RLC blocks, interpret the received information and the temporary flow identifier TFI received therewith.

The USF field can be given 8 different values, and the downlink USF value defines the mobile station for which the next corresponding uplink block is allocated for data transmission.

A so-called temporary block flow TBF is a logical connection supporting data transmission on physical packet data channels between a sender (such as a mobile station MS) and a receiver (such as a base transceiver station BTS in the network), particularly between end points which are located on the RLC layers of their communication protocols. For the TBF, resources are allocated on one or several PDCH channels, and it comprises several RLC/MAC blocks conveying information. The TBF is maintained during the data transmission, until all the RLC/MAC blocks are transmitted or the receiver has reported all the transmitted blocks to be received. Each uplink or downlink TBF is allocated an individual temporary flow identity TFI. With a PUA (Packet Uplink Assignment) or PDA (Packet Downlink Assignment) message received by the mobile station from the network, the mobile station is allocated number N (1 to 8) of PDCH channels to be monitored by the mobile station, wherein the value N depends on the MS multislot class, the number of which can at present range from 1 to 29.

With reference to FIG. 2, each transmitter uses a so-called transmit window with a predetermined size. Similarly, each receiver uses a so-called receive window with a predetermined size. The windows mentioned in this description will be jointly called a transfer window. At the present, in the GPRS and EGPRS (Enhanced Packet Radio Service) systems the size k for both windows is defined as a standard window size k=64, i.e. 64 data blocks (RLC data blocks), within which the transmission takes place. Correctly received data blocks are acknowledged to the transmitter which "transfers" the window forward and makes it possible to transmit new data blocks. In addition to this, the receiver may transmit request for retransmission of incorrect data blocks, after whose acknowledgement the window is also "transferred". In some situations, the window is "stalled", wherein the transmission of new data blocks is interrupted. With an increase in the properties of mobile station so that the number of data blocks received in the same time unit is increased, also interruptions have been found to occur more and more frequently.

SUMMARY OF THE INVENTION

It is an aim of the present invention to present a method for reducing interruptions in data transmission, wherein also the properties of different mobile stations are taken into account. It is also an aim to present a mobile station applying the method.

The method according to the invention is characterized in what will be presented in the characterizing part of the appended claim 1. The mobile station according to the invention is characterized in what will be presented in the characterizing part of the appended claim 12.

An essential principle in the invention is to use RLC receive/transmit windows with varying size in packet-switched systems based on a cellular system, such as GPRS and EGPRS. An essential principle in the invention is also to negotiate the window size between the mobile station and the network during establishing of the TBF flow. Another essential principle is that instead of negotiating, a default size is used for the window, determined according to the multislot class of the mobile station. An essential principle is also to use a maximum default size if the class is not known or negotiating is not used.

With the present invention, significant advantages are achieved when compared with systems of prior art. A considerable advantage is that by using a variable window size, the data transmission to be started can be optimized to maximize the number of data blocks received. At the same time, the optimization can take into account the properties of the mobile station, the resources available, and for example memory space available.

The invention is also applicable in a situation in which the downlink and uplink RLC windows can have different sizes and their size is negotiated separately. The default sizes of downlink and uplink windows for different classes can differ also in the same mobile station. In the following description, in an embodiment of the invention, the uplink and downlink windows have the same size, but the presented method can be applied in the negotiation of the window sizes also independently. The principle is that the window sizes are negotiated to be such that the RLC protocol works as well as possible with any possible channel coding alternative. In addition to the class, the default size of the RLC window can be affected by other properties of the mobile station, because even mobile stations of the same class can differ from each other e.g. in the GPRS and EGPRS systems. For example, with the codings MCS-7 and MCS-8 (Modulation and Coding Scheme) of the EGPRS system, each radio block contains the codes for two RLC/MAC blocks. Also the number of information bits in the RLC data block is dependent on the coding.

Retransmission of incorrectly received radio blocks is the responsibility of the RLC layer in the communication protocol. The retransmission mechanism is based on the above-described transmit/receive windows. The size of this window is always a compromise between the demands of the communication protocol used and the memory space available. Too small a transmit window will cause stalling of the window which reduces the number of transmitted data considerably. The demand on the size of the window is directly proportional to the properties of the mobile station, wherein when the mobile station is capable of receiving data in several time slots simultaneously, the number of received blocks per second is high (high multislot class) and a large window would therefore be needed. For the use of a standard size, it should naturally be determined according to the greatest multislot class of mobile stations. However, this involves the problem that in the RLC layer, the demand of memory required for the lower classes would thus be the same as for the higher classes. This results in problems of compatibility between newer and older devices.

BRIEF DESCRIPTION OF THE DRAWINGS

In the following, the invention will be described in more detail with reference to the appended drawings, in which.

DETAILED DESCRIPTION OF THE PREFERRED EMBODIMENT(s)

Figure 1:
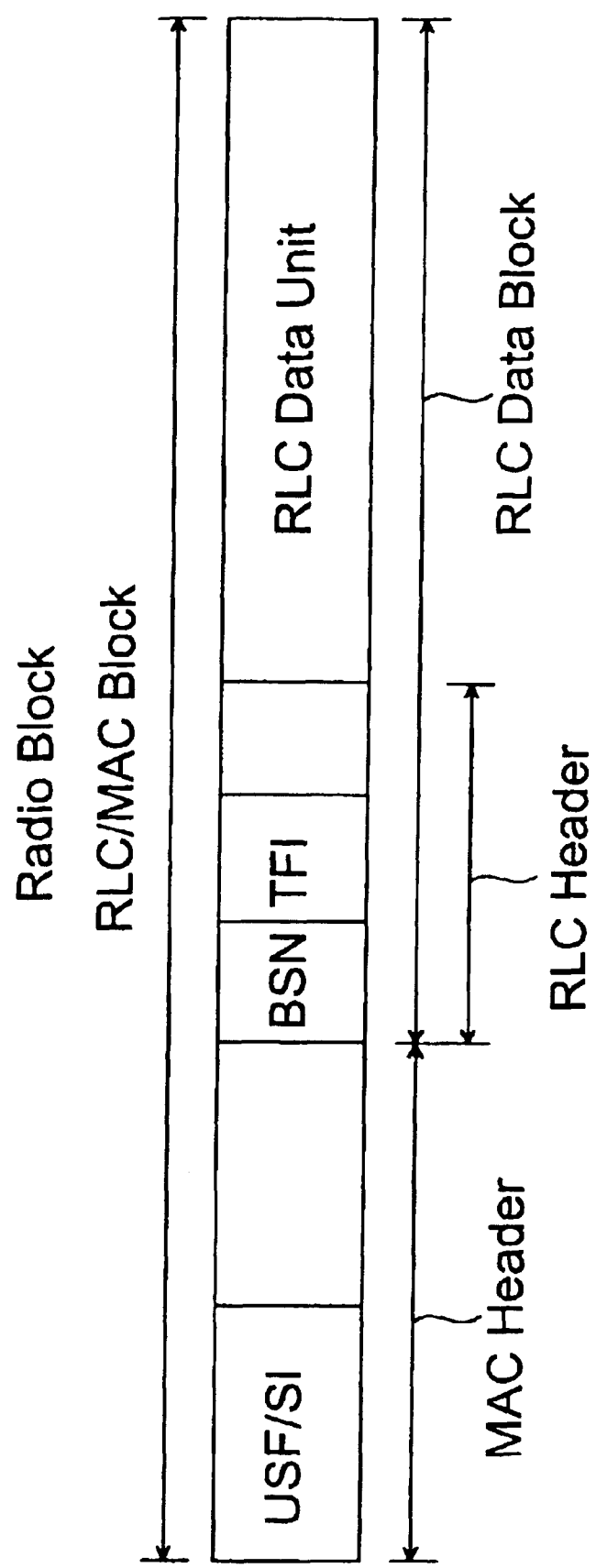
FIG. 1 shows the block structure according to prior art, particularly the radio block structure in the GPRS system.
Figure 2:
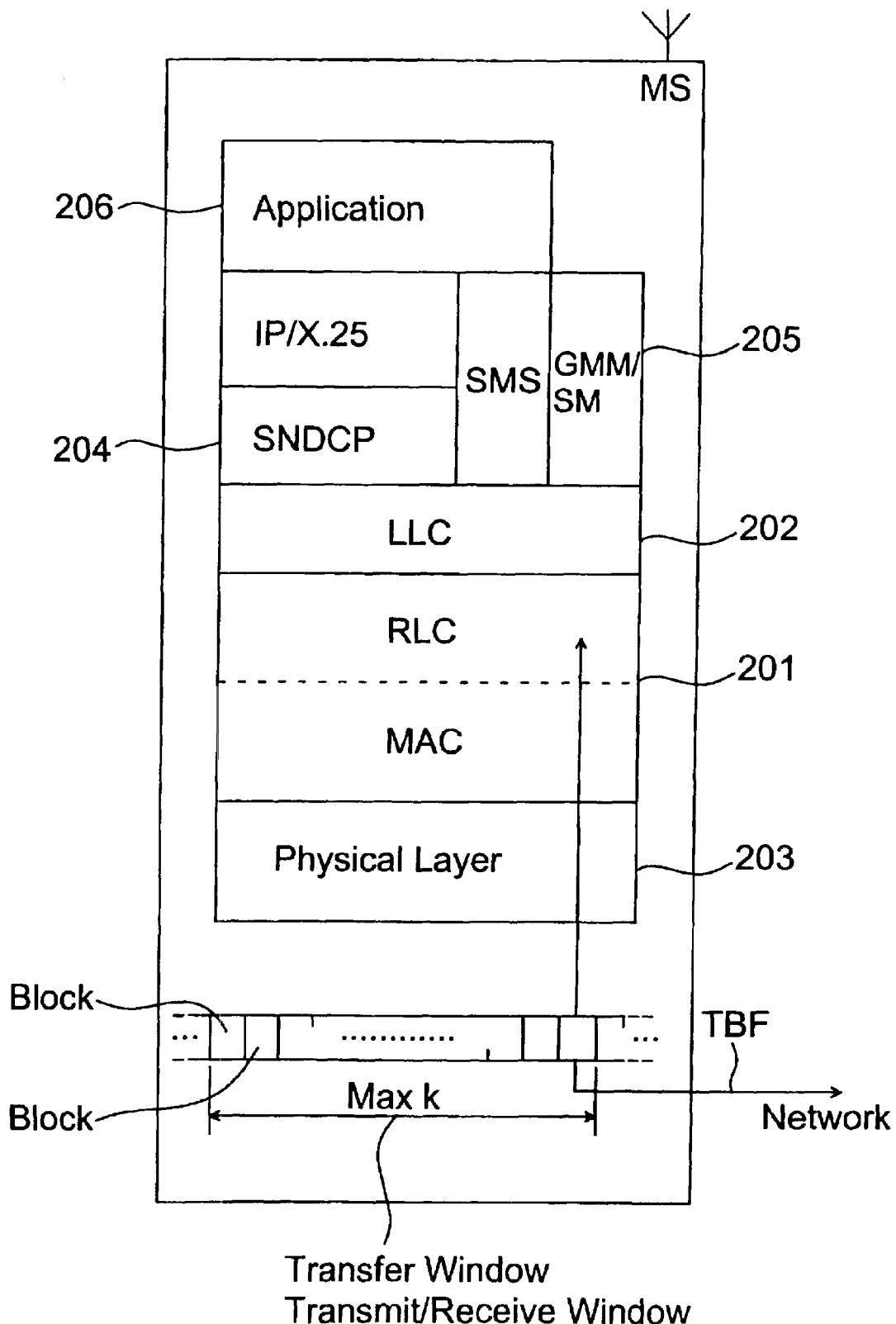
FIG. 2 shows a protocol stack according to a communication protocol of prior art, particularly the protocol stack of the GPRS system.

The network acknowledges the reception of blocks to the mobile station by transmitting a PUA/N (Packet Uplink Ack/Nack) message on the PACCH channel, if necessary. Also the mobile station acknowledges the reception of blocks to the network if necessary or if requested by the network by sending a PDA/N (Packet Downlink Ack/Nack) message if needed. In a certain mode (Acknowledged Mode), the blocks whose reception was failed are retransmitted, if necessary.

In the following, the operation of the transmitter of the blocks will be discussed. The end point acting as the transmitter stores the BSN value of the data block to be transmitted next in the variable V(S) (Send State Variable), wherein the V(S) can have a value from 0 to 127. After transmission of said data block, the V(S) gets a new value in the following way: V(S)=BSN+1. According to prior art, the window size k for the transmit window ($k_T$) and for the receive window ($k_R$) is at present defined to be fixed k=$k_T$=$k_R$=64. In addition to this, a stored variable V(A) (Acknowledge State Variable) contains the BSN value of the oldest data block acknowledged (ACKED) by the receiver, wherein the V(A) can have a value from 0 to 127. However, the value V(S) must not exceed the value [V(A) modulo 128] by more than k. Modulo refers here the remainder of the calculation; for example, the calculation [64 modulo 128) gives the result 64.

Furthermore, in a table V(B) (Acknowledge State Array) containing 128 elements, the transmitter stores k exemplars of the status of the successive RLC data blocks transmitted previously, if the block was not reported to be correctly received within the set time (NACKED) or if said acknowledgement is still being waited (PENDING_ACK). The table V(B) is thus indexed with respect to the variable V(A). Retransmission of blocks is started from the oldest block with the status NACKED.

Blocks with the status NACKED are retransmitted and their status is changed to PENDING_ACK. After the transmission, the transmission of new blocks is continued, after which the V(S) receives the BSN value of the block to be transmitted next. When the value V(S) reaches the value [(V(A)+k) modulo 128], for example the value 86 when V(A) has the value 32, the transmit window is said to be stalled, wherein the transmission of new data blocks is interrupted and the transmission is executed continuously again starting from the oldest data block with the status PENDING_ACK. To indicate the interruption, the SI field is set in all uplink data blocks.

Upon interruption of the transmit window, a so-called counter T3182 is started, which is, however, interrupted and reset when the transmitter receives from the receiver a PUA/N message, which results in that the value V(S) is smaller than the value [(V(A)+k) modulo 128], wherein the transmission of new data blocks can be started again and the SI field is restored. In another case, when the counter expires, the TBF flow is released (abnormal release) and for example the mobile station terminates said TBF data transmission.

Next, we shall discuss the operation of the receiver of the blocks. The end point acting as the receiver stores the BSN value of the data block received next in the variable V(R) (Receive State Variable), wherein the V(R) can have a value from 0 to 127. Furthermore, in a table V(N) (Receive State Array) comprising 128 elements, the receiver stores k exemplars of the status of the successive RLC data block received earlier, wherein the received block has the status RECEIVED. The table V(N) is indexed with respect to the variable V(R). The variable V(R) is given the value BSN, if the block was received correctly and if the BSN does not exceed the value (V(Q)+k) modulo 128]. The variable V(Q) (Receive Window State Variable) indicates the BSN value of the oldest data block not received within the receive window, wherein the V(Q) can have a value from 0 to 127. The value of the V(Q) is updated again upon receiving a data block whose BSN corresponds to the V(Q) value of the variable. The received data blocks are reported to the transmitter by means of a PUA/N or PDA/N message.

According to the first embodiment of the present invention, the value of the variable k, i.e. the size of the so-called RLC window is fixed up by negotiating between the transmitter and the receiver. The principle is that upon establishing a packet data transmission, the mobile station indicates the requested size of the RLC window to the network. This takes place in connection with the normal exchange of setting information. The network can accept the requested window size by replying with the requested window size or, alternatively, impose the mobile station to use a smaller window size by responding with the new window size.

In one phase access, the mobile station transmits a packet channel request (PCR on a PRACH or RACH channel) for requesting resources from the network. Said channel request usually contains also information on the multislot class of the mobile station. The network replies by transmitting a PUA acknowledgement message (Packet Uplink Assignment on a PAGCH or AGCH channel) indicating the resources allocated for the mobile station for uplink data transmission, such as a list of the PDCH channels available and the value of the USF field to be used, or resources for the PRR message of the mobile station. The USF field contains 3 bits at the beginning of each radio block used in downlink data transmission. Thus, in multiplexing of uplink data transmission, 8 different values can be used for the USF field. The individual TFI identification is determined and annexed to each RLC data block used in the communication. In the PCR message, the mobile station does not indicate the desired window size, whereby said negotiation is not conducted according to the first advantageous embodiment of the invention. Instead, according to a second advantageous embodiment of the invention, a default window size is used, determined according to the multislot class of the mobile station. If the class is not given, according to the third advantageous embodiment of the invention, the default size k=64 will be used.

In two phase access, a reply to the PCR channel request by the mobile station is to report, by means of an immediate acknowledgement message, i.e. PUA message, the resource in which the mobile station can transmit a PRR message (Packet Resource Request on the PACCH channel), wherein said negotiation can be carried out. By means of the resource request, i.e. PRR message, transmitted by the mobile station, the mobile station asks the network to allocate resources for starting the TBF flow of packet data transmission, in which message the mobile station indicates the requested window size. The mobile station can ask for a window size which is larger than (or equal to) the default window size for the multislot class, but the window size must be smaller than (or equal to) the maximum size. In an example, a mobile station of class 9 can ask for a window size from 256 to 1024. As a confirmation on the window size, or to determine a new window size, the network transmits a PUA message (Packet Uplink Assignment on the PACCH channel) to the mobile station. The window size determined by the network must be smaller than (or equal to) the window size requested by the mobile station and greater than (or equal to) the default window size for the class of the mobile station in question.

According to the example, the window size requested for the mobile station of class 9 is 512, wherein the network can determine the window size from 256 to 512 (default value 256). It should be noticed that the signalling of the requested window size is not necessary, but predetermined window sizes can be used. For example, with three information bits transmitted in a PRR message, it is possible to indicate 8 different window sizes.

The maximum size k for the transfer window can be negotiated also during the data transmission connection to change the maximum size, wherein the mobile station transmits the above-mentioned PCR message and the network replies with said PUA acknowledgement message. For example in the GPRS system, the mobile station first performs login in the network (GPRS attach), whereby the mobile station reports that it is ready for the transmission of packet data. The entry makes a logical link, making it possible to address incoming packet data to the mobile station. According to an advantageous embodiment of the invention, information on the window size to be used is transmitted in connection with the attach, for example in transmitted messages.

The method according to the invention can be applied in the above-presented way in the GPRS and EGPRS systems. If the window size is not negotiated, a default window size can be used, wherein the advantage is that the system is compatible with also older implementations of the GPRS.

According to the present invention, the value of the variable k, i.e. the default size of the so-called RLC window, is dependent on the MS multislot class according to the following table:

| MS Multislot Class | Default value $k_T$ $k_R$ for RLC window | Value (3 bits) |
|---|---|---|
| Not known | k = 64 | 000 |
| 1, 2, 3 or 5 | k = 64 | 000 |
| 4, 6 or 7 | k = 128 | 001 |
| 8, 9, 10, 11, 12, 13, 14 or 15 | k = 256 | 010 |
| 16 or 17 | k = 512 | 011 |
| 18 | k = 1024 | 100 |
| 19, 20, 21, 22 or 23 | k = 512 | 011 |
| 24, 25, 26, 27, 28 or 29 | k = 1024 | 100 |
|  | Reserved | Other values |

In the table presented above, the different predetermined values of k form a group of maximum sizes k, from which group the selection is made. The table presents also a coding for the window size request in a PRR message by means of three information bits. A group coded with three bits comprises a maximum of 8 different maximum sizes k. The term GPRS multislot class, known as such, refers to different mobile stations and their capability to transmit and receive data on different physical PDCH channels on several different logical channels in different combinations. A mobile station may have a different multislot class for circuit-switched services on one hand and for the GPRS system on the other hand. Also, mobile stations of different multislot classes support different medium access modes MA, of which dynamic allocation, extended dynamic allocation, and fixed allocation, known as such, should be mentioned in this context.

When the greatest value k is 1024 according to the invention, the values of the above-described variables V(A) V(S), V(Q) and BSN must, in a corresponding manner, be between 0 and 2047, i.e. a maximum of $[(2 \times k)-1]$. Thus, 11 bits must be used in the RLC header to indicate the BSN.

Similarly, the number of elements in the tables V(B), V(N) has a maximum of $[(2 \times k)-1]$.

According to prior art, the GPRS multislot classes are defined according to the following table:

| Multislot class | Maximum number of time slots used | |
|---|---|---|
|  | Reception RX | Transmission TX |
| 1 | 1 | 1 |
| 2 | 2 | 1 |
| 3 | 2 | 2 |
| 4 | 3 | 1 |
| 5 | 2 | 2 |
| 6 | 3 | 2 |
| 7 | 3 | 3 |
| 8 | 4 | 1 |
| 9 | 3 | 2 |
| 10 | 4 | 2 |
| 11 | 4 | 3 |
| 12 | 4 | 4 |
|  | 3 | 3 |
| 14 | 4 | 4 |
| 15 | 5 | 5 |
| 16 | 6 | 6 |
| 17 | 7 | 7 |
| 18 | 8 | 8 |
| 19 | 6 | 2 |
| 20 | 6 | 3 |
| 21 | 6 | 4 |
| 22 | 6 | 4 |
| 23 | 6 | 6 |
| 24 | 8 | 2 |
| 25 | 8 | 3 |
| 26 | 8 | 4 |
| 27 | 8 | 4 |
| 28 | 8 | 6 |
| 29 | 8 | 8 |

For the EGPRS system, corresponding classes can be defined, of which the classes defined for a mobile station operating in the GPRS system as defined in the GSM specifications are used as an example.

The class is not always given in the PCR message, wherein if information on the class is not transmitted during setting up of the packet data connection, according to the third advantageous embodiment of the invention a default RLC window size k=64 is used, which is typically the smallest size in the above-mentioned group. The class is not given e.g. in a short request message or in a message requesting for transmission of a signalling message. The properties of mobile stations of the same class may vary between the GPRS and EGPRS systems (way of coding, modulation capacity, different parameters). Thus, in addition to the class, the default RLC window size to be used according to the invention is also dependent on another property, on the basis of which the maximum size is selected.

In the following, the more detailed structure of the mobile station used as an example will be discussed, together with the means for receiving and transmitting data. The mobile station comprises an antenna connection, through which downlink data is directed to the mobile station; next, there are radio and intermediate frequency elements, through which the received radio-frequency signal is converted to baseband frequency. The information contained in the baseband signal is reconstructed in a demodulator, after which the processing of the received signal can differ according to whether it is signalling or data. Information is directed to a channel decoder and via th at to a control block, which is a microprocessor and controls the operation of the mobile station. Information contained in uplink data is generated in the control block and it is channel coded. In a modulator, the data is integrated in baseband frequency and mixed to a radio frequency by means of radio-frequency elements, after which it can be transmitted via the antenna connection.

For anyone skilled in the art, it is easy in practice to define the message transmission according to the invention as described above and e.g. to define the protocol means, because the mobile station operates fully under the control of its control block. The control block, in turn, is a microprocessor which runs a program stored in the memory means available to it and which is also used to implemented said protocol means and said transfer window. When this program is written in such a way that the processing of the window size takes place by means of the protocol means in a defined manner, the mobile station can be made to operate in a desired way according to the invention.

The present invention is not limited solely on the embodiments presented above, but it can be modified within the scope of the appended claims. It is obvious that the negotiated rules of the invention, the size predetermined according to the class, the defined negotiation and default maximum size for selecting the maximum size used in the transfer window, can also be applied in other systems. Thus, the invention may vary in its detailed implementation, but on the basis of this description, its application will be obvious as such for anyone skilled in the art. Furthermore, the predetermined maximum sizes and the relations between them may also differ from those presented. The invention can also be applied e.g. in the UMTS system (Universal Mobile Telecommunication System).

What is claimed is:

1. A communication method for transmission and reception of data blocks in a packet-switched communication network based on a cellular network (PLMN), between elements which are used as transmitters and receivers and which comprise means for receiving data blocks, means for transmitting data blocks, and protocol means for forming and processing data blocks (201–206), wherein for the transfer of data blocks:

at least one transfer window is formed which, formed in at least one transmitter, is used as a transmit window, which, formed in at least one receiver, is used as a receive window, and which covers a maximum size of k data blocks to be transferred, and wherein for optimizing the transfer of data blocks, said maximum size k is selected from a group consisting of several maximum sizes, wherein said maximum size k is selected according to a multislot class characteristic of a mobile station.

2. The method according to claim 1, wherein said maximum size k is selected in a way that the maximum size k of said at least one transfer window as a transmit window and the maximum size k as a receive window differ from each other in the same element.

3. The method according to claim 1, wherein:

a transmit window is defined in the transmitter, to cover a maximum number of $k=k_T$ of data blocks transmitted last, status data on said data blocks are stored in the transmitter, the status data indicating at least if the receiver has acknowledged the transmitted data block as received and if it was received correctly, the transmission of new data blocks is continued, said status data covering less than said maximum number $k_T$ of said data blocks, and the transmission is interrupted when said status data cover said maximum number $k_T$ of said data blocks, a receive window is defined in the receiver, covering a maximum number of $k=k_R$ of data blocks received last, and status data on said data blocks are stored in the receiver, the status data indicating at least if the data block was received, and said maximum size $k_R$ of the receive window to be used and said maximum size $k_T$ of the transmit window to be used are selected to be equal.

4. The method according to claim 1, wherein said maximum size k of the transfer window is negotiated by means of a message transmitted by the transmitter and a reply message transmitted by the receiver, wherein said message and said reply message comprise information on the maximum size k of the transfer window to be used.

5. The method according to claim 1, wherein the multislot class characteristic describes one or more properties of said mobile station in transmission and reception, wherein each multislot class characteristic is represented by a predetermined maximum size k of the transfer window.

6. The method according to claim 5, wherein the maximum size k of said transfer window is set as such a predetermined maximum size which does not exceed the maximum size k requested by the transmitter in its message and which is not smaller than the maximum size k predetermined according to the class.

7. The method according to claim 1, wherein the maximum size k of the transfer window is set as a predetermined default maximum size $k_D$, if the class characteristic to said mobile station is not known, the class describing the properties of said mobile station in transmission and reception, or the maximum size k of the transfer window is not negotiated by means of a message transmitted by the transmitter and a reply message transmitted by the receiver.

8. The method according to claim 7, wherein the communication system used is a system based on the GPRS or EGPRS system, and that said default maximum size $k_D$ used is the predetermined maximum size 64.

9. The method according to claim 1, wherein the communication system used is a system based on the GPRS or EGPRS system, and that the maximum size k of the transfer window is selected from a group of maximum sizes, the group comprising at least predetermined values of 64, 128, 256, 512, and 1024.

10. The method according to claim 1, wherein said transfer window is implemented in the RLC layer of said protocol means.

11. The method according to claim 1, wherein the communication system used is a system based on the GPRS or EGPRS system, that a packet resource request message is transmitted from the mobile station, indicating the maximum size k desired for the transfer window, and that a packet uplink acknowledgement message is transmitted as a reply from the network, indicating the maximum size k to be used for the transfer window.

12. A mobile station arranged to operate in a packet-switched communication network based on a cellular network, the mobile station comprising means for receiving downlink data blocks from the network, means for transmitting uplink data blocks to the network, and protocol means for generating and processing data blocks, wherein for the transmission of data blocks, the mobile station is arranged to generate at least one transfer window, which is used as a transmit window upon transmission and as a receive window upon reception, and which covers a maximum size of k data blocks to be transferred, wherein for optimizing the transfer of data blocks, the mobile station is also arranged to select the maximum size k to be used at a time from a group consisting of several alternative maximum sizes, wherein said maximum size k is arranged to be selected according to a multislot class characteristic of the mobile station.

13. The mobile station according to claim 12, wherein the mobile station is also arranged to store transmission status data on said data blocks, the status data indicating at least if the network has acknowledged the transmitted data block as received and if it was received correctly, to continue the transmission of new data blocks, said transmission status data covering less than said maximum number k of said data blocks and to interrupt the transmission when said transmission status data cover said maximum number k of said data blocks, to store reception status data on said data blocks, the status data indicating at least if the data block was received, wherein each multislot class characteristic is represented by a predetermined maximum size k, the multislot class characteristic describing one or more properties of the mobile station in question in transmission and reception, wherein the mobile station is also arranged to negotiate said maximum size k by means of a message transmitted to the network and a reply message received from the network, wherein said message and said reply message comprise information on said maximum size k used, and to set said maximum size k as a predetermined default maximum size k, if said the multislot class characteristic is not known or if the maximum size k is not negotiated.

14. The mobile station according to claim 12, arranged to operate in a system based on the GPRS or EGPRS system.

* * * * *